United States Patent [19]

Mendoza

[11] 3,854,864

[45] Dec. 17, 1974

[54] OVEN ARRANGEMENT

[76] Inventor: Fausto Celorio Mendoza, Cumbres de Acultzingo No. 185, Lomas de Chapultepec, Mexico 10, D. F., Mexico

[22] Filed: Dec. 5, 1973

[21] Appl. No.: 421,778

[30] Foreign Application Priority Data
June 26, 1973 Mexico .............................. 144536

[52] U.S. Cl. .................. 432/130, 432/143, 34/203, 34/207
[51] Int. Cl. ............................................ F27b 9/02
[58] Field of Search ........................... 432/128–130, 432/136, 137, 143, 146, 162, 163, 209, 241; 34/207, 203, 208, 216, 217, 171, 178, 95; 126/4, 22; 99/443; 214/21; 198/206, 207

[56] References Cited
UNITED STATES PATENTS

| | | | |
|---|---|---|---|
| 1,040,556 | 10/1912 | McMullen | 34/203 |
| 1,280,205 | 10/1918 | Garza | 432/143 |
| 1,356,469 | 10/1920 | Pierce | 34/207 |
| 2,419,875 | 4/1947 | Birdseye | 34/95 |
| 3,456,578 | 7/1969 | Pinsly | 99/443 R |
| 3,549,003 | 12/1970 | Jacobson | 198/207 |

*Primary Examiner*—John J. Camby
*Assistant Examiner*—Henry C. Yuen
*Attorney, Agent, or Firm*—Albert L. Jeffers; Roger M. Rickert

[57] ABSTRACT

An oven in which a plurality of conveyors are arranged in superposed relation with articles to be cooked being transferred from the upper conveyor downwardly to the conveyors therebeneath in succession and being discharged in baked condition from the lowermost conveyor. Each conveyor is provided with means for heating the upper reach with a tunnel arrangement enclosing at least the upper reach of each conveyor for the conservation of heat. Advantageously, the tunnel arrangements for the conveyors beneath the uppermost also enclose the lower reach of the conveyor next thereabove so that the heat contained in the lower reach is available in the baking process. The oven arrangement includes a frame in which rollers are provided supporting the conveyors and which frame may include hollow elements for conducting fuel to the burners for the respective conveyors.

13 Claims, 6 Drawing Figures

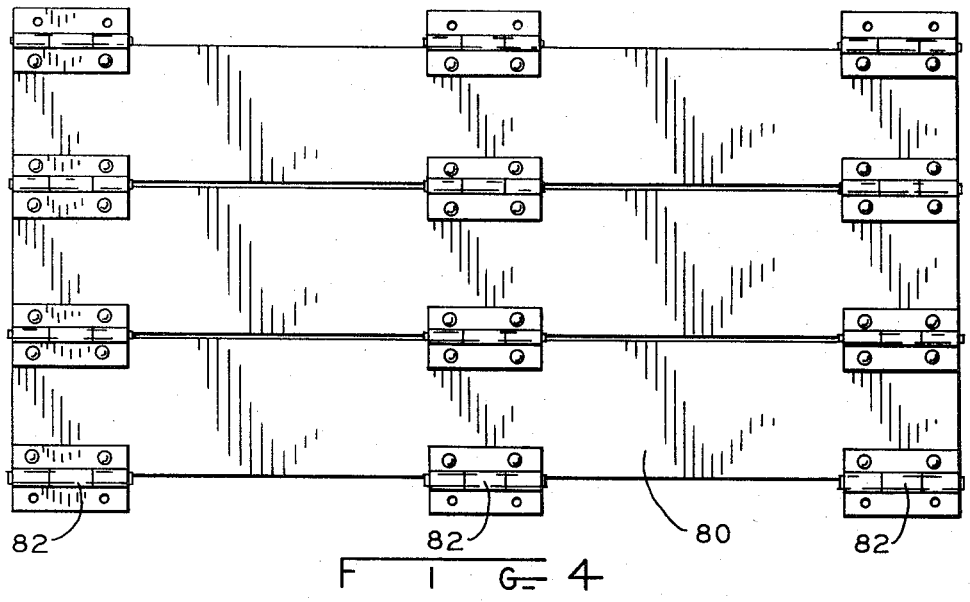
FIG. 4
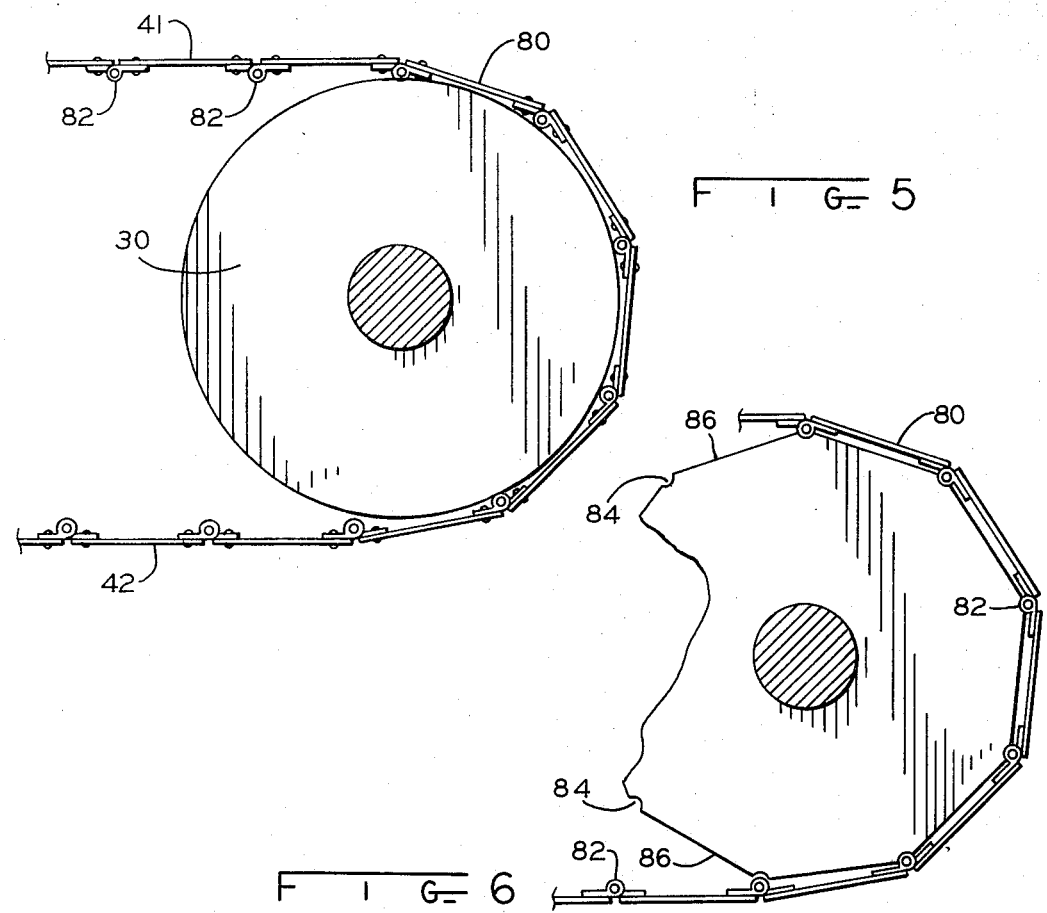
FIG. 5
FIG. 6

OVEN ARRANGEMENT

The present invention relates to a food cooking apparatus and, in particular, to an oven.

Ovens are known in which foods are baked in commercial quantities, and the present invention is concerned with such an oven especially constructed and arranged to be highly economical to operate.

Ovens of the nature referred to are known which comprise superposed cooking stages, each stage having a conveyor of which the upper reach is heated and with each conveyor discharging the product or articles being baked to the upper reach of the conveyor next therebeneath with the completely cooked articles being discharged from the lowermost one of the conveyors.

Such cooking or baking devices are satisfactory in respect of treating the articles being baked but, heretofore, have been relatively inefficient with respect to utilization of the heat supplied thereto. This comes about because the conveyors are usually enclosed within a single large enclosure so that considerable amount of heat is required for maintaining the oven enclosure at the proper temperature.

With the foregoing in mind, the present invention proposes the construction of an oven arrangement in which the volume of the enclosure that requires heating is substantially reduced thereby reducing the amount of heat required.

A further object is the provision of an oven arrangement of the nature referred to which is efficient in operation and which is relatively simple in construction.

A still further object of the invention is the provision of an oven arrangement in which heating means are provided for individual conveyors with tunnel arrangements provided to enclose the conveyors and with space being provided for admitting combustion air to the heaters for each conveyor.

A particular object of the present invention is the provision of an arrangement for utilizing the heat remaining in each conveyor in the lower reach thereof to contribute to the economy of the process.

BRIEF SUMMARY OF THE INVENTION

According to the present invention, an oven is provided having a frame and in which frame there are provided substantially horizontal conveyors in vertically superposed relation with rollers near the ends of the frame supporting the respective conveyors at the reversing points thereof.

Heating means is provided beneath the upper reach of each conveyor, preferably in the form of burners, and a tunnel encloses at least the upper reach of each conveyor so that a fairly small volume of space is required to be heated in respect of each conveyor. Advantageously, each tunnel below the uppermost one also encloses the lower reach of the conveyor next thereabove so that the heat contained in the lower reach is not lost.

The articles on the upper reach of each conveyor are transferred to the upper reach of the next conveyor therebeneath and are discharged to an outgoing conveyor from the bottom one of the superposed conveyors. Each conveyor comprises plates hinged together for supporting the articles and the conveyors are held taut within the frame of the oven.

Advantageously, the oven is made up of hollow framework and fuel for the burners may be conveyed through the framework to the burners. The tunnels are spaced apart in the vertical direction and combustion air can, thus, flow laterally between the tunnels to the burners pertaining thereto.

The objects referred to above as well as other objects and advantages of the present invention will become more apparent upon reference to the following detailed specification taken in conjunction with the accompanying drawings in which;

FIG. 4 is a plan view showing a fragment of a typical conveyor from underneath the upper reach thereof.

FIG. 5 shows the manner in which the plates of the conveyor hinge in passing around a reversing roller at the end of the conveyor.

FIG. 6 is a fragmentary view showing how the reversing roller could be configured for engaging only the hinges of the conveyor.

DETAILED DESCRIPTION OF THE INVENTION

Figure 1:
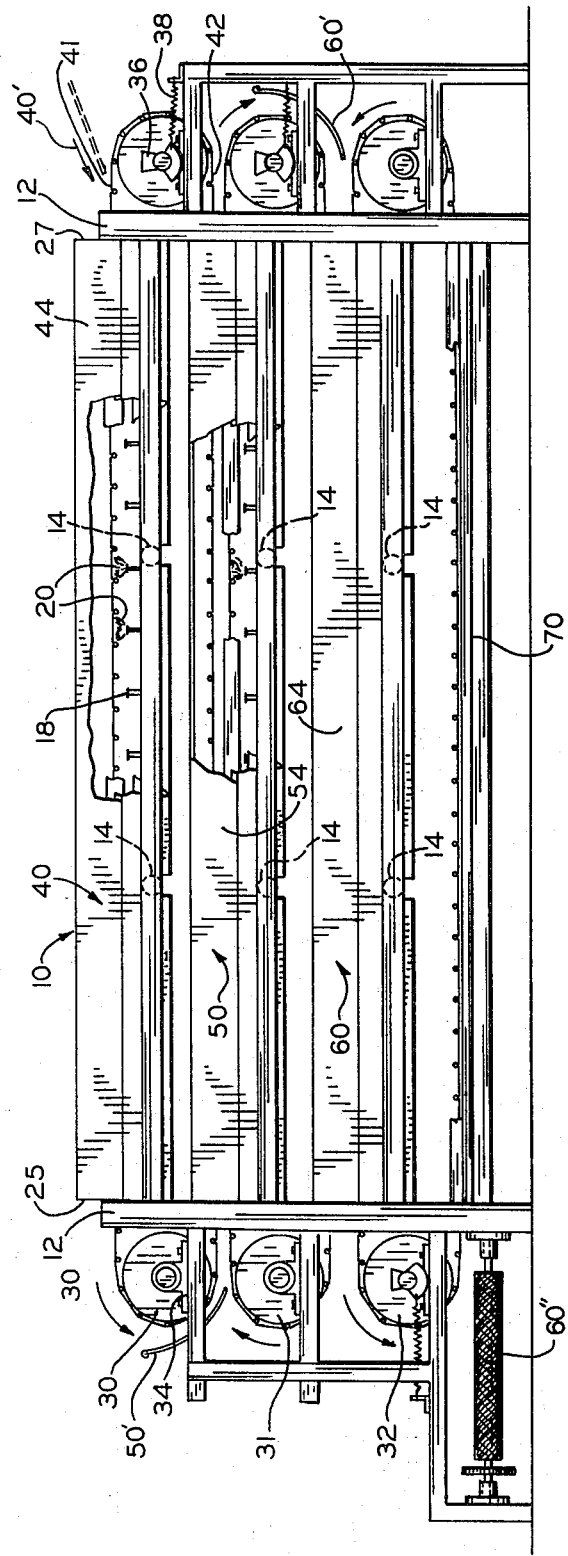
FIG. 1 is a side view partly broken away showing an oven according to the present invention.

Referring to the drawings somewhat more in detail, the oven of the present invention is generally indicated at 10 and is made up of a frame 12 which may include hollow tubular elements forming the framework and including elements extending longitudinally of the oven.

Laterally extending fuel ducts 14 extend transversely in the frame between the aforementioned longitudinally extending tubular elements and supply fuel to center burner tubes 16 which extend longitudinally of the frame in about the center thereof. Burner tubes 16 have burners 18 distributed therealong which support flames 20.

The burners are disposed beneath the upper reaches of the several conveyors disposed in the frame and, thus, are disposed between the upper and lower reaches of each conveyor. The conveyors include endless members supported on the reversing rollers 30, 31 and 32 and each conveyor comprises an upper reach 41 and a lower reach 42. As will be seen in FIG. 2, the burner tubes 16 extend longitudinally in about the middle of the width of each conveyor and beneath the upper reaches thereof.

The oven according to the present invention has an upper stage 40 and a stage 50 therebeneath and a lower stage 60, each comprising a conveyor of the nature described above.

Articles are supplied at the upstream end of the upper reach of the conveyor of the uppermost stage 40 as indicated by arrow 40' and at the downstream end of the upper reach of the conveyor of the upper stage the articles on the conveyor are discharged and are directed to the upper reach of the conveyor of stage 50 as by deflector plate 50'.

Similarly, a deflector plate 60', in turn, directs the articles to the upper reach of the conveyor of lowermost stage 60 and at the downstream end of the upper reach of the conveyor in lowermost stage 60 the articles are delivered to a discharge conveyor 60''.

Figure 2:
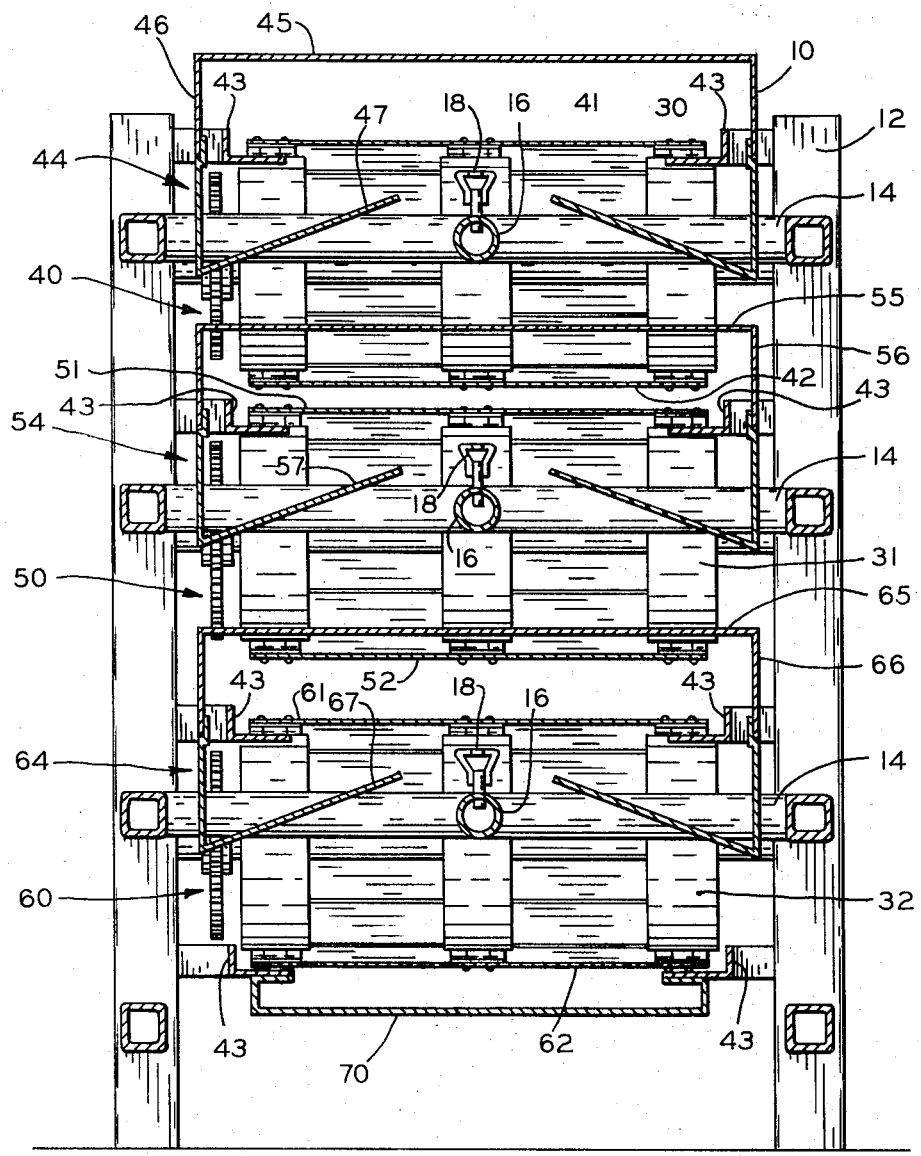
FIG. 2 is an end view partly broken away showing the interior of the oven construction.

As will be seen in FIG. 2, each of the aforementioned stages 40, 50, 60 has a melt tunnel associated therewith and generally indicated by the reference numerals 44, 54, 64. Each of the heating tunnels has an upper wall 45, 55, 65 above the upper reach of the respective conveyor and extending substantially horizontally. At the end edges of the upper walls, side walls 46, 56 and 66 are provided which extend downwardly toward but terminate short of the top wall of the tunnel next therebeneath.

From the lower edges of the aforementioned side walls there extends in the inward and upward direction inclined walls 47, 57, 67 in the tunnels and these side walls terminate on opposite sides of the respective burner tubes 16 in spaced relation thereto, thus, leaving a space through which combustion air can flow to the burners and thence into the respective tunnel.

It will be noted that the lower reach 42 of the uppermost conveyor is beneath top wall 55 of tunnel 54 and is in opposed relation to top reach 51 of the conveyor pertaining to heating tunnel 54 and, thus, the heat combined in the lower reach 42 of the conveyor is effective for reducing the heat requirements in respect of tunnel 54.

It will be appreciated that combustion air for the burners 18 carried by the burner tubes 16 can flow laterally inwardly through the space between adjacent tunnels. The tunnels may be open on the ends and the described arrangement permits the heating of the minimum amount of space so that efficient conditions prevail in respect of supplying heat to the articles being cooked.

Each conveyor, as mentioned, passes about reversing rollers and may be confined in the lateral direction by guide members 43 at the sides thereof and supported by the oven frame. The aforementioned openings at the ends of the tunnels, and which may have relatively small dimensions, are indicated at 25 and 27 in FIG. 1 in respect of the uppermost one of the conveyors. By controlling the sizes of these openings, the rate of escape of hot gases from the respective heating tunnel can be controlled.

Figure 3:
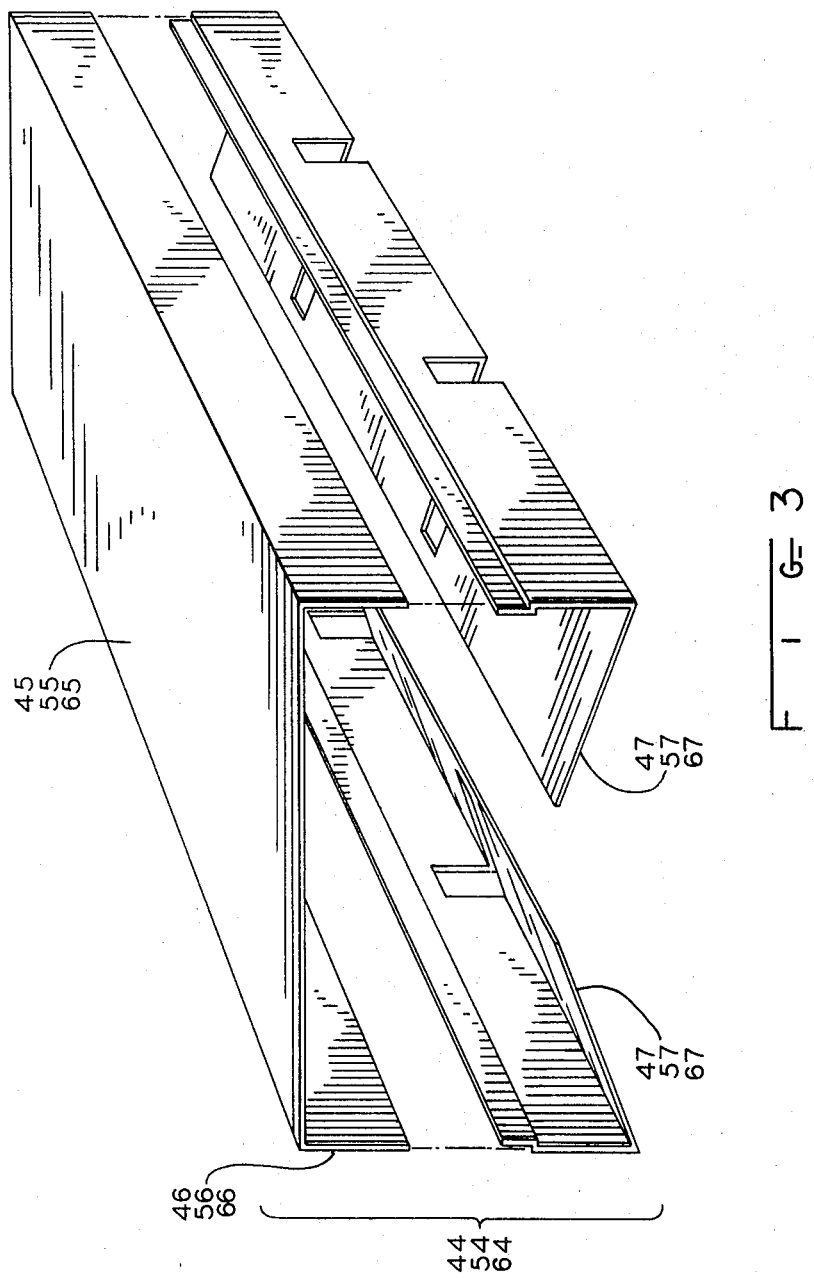
FIG. 3 is a perspective view showing the parts of a typical heating tunnel surrounding reaches of the conveyors.

With regard to the manner in which the tunnels are constructed, the various tunnel parts are shown in perspective in FIG. 3. These parts are identified by the reference numerals which have been employed above, and it will be seen that the tunnel parts can consist of relatively simply formed and cut sheet metal.

A typical conveyor structure is shown in FIG. 4 wherein it will be seen that the conveyor comprises flat metal plates 80 arranged in co-extensive adjacent relation and each plate connected to the others adjacent thereto as by three hinges 82.

The hinges permit the conveyor to flex freely in one direction but can be constructed to limit flexing in the other direction. In any case, the upper reach of each conveyor is advantageously supported by a horizontal flange extending from member 43 and engaging underneath the side edges of the upper reach of the respective conveyor.

A typical reversing roll is shown at 30 in FIG. 5, and it will be seen to engage the hinges on the inside of the respective conveyor reach.

Each reversing roller could be formed as shown in FIG. 6 wherein the reversing roller has notches 84 which engage the hinges 82 with intervening portions of the roller at 86 spaced from the plates of the conveyor.

The rollers at opposite ends of the frame can be made adjustable in any suitable manner and FIG. 1 shows that the roller at one end of each conveyor is mounted on a moveable support 36 which is biased by a respective spring 38 to hold the pertaining conveyor taut. The other roller for each conveyor is, of course, fixed in the frame.

The present invention will be seen to provide an oven structure in which the capacity is large but wherein the volume that must be heated to maintain the proper cooking temperature is substantially reduced over heretofore known constructions so that highly efficient cooking conditions can be established and maintained.

In order to conserve heat that might otherwise be lost from the lower reach of the lowermost conveyor, there is advantageously a bottom cover plate 70 mounted on the frame beneath the said reach.

Modifications may be made within the scope of the appended claims.

What is claimed is:

1. A multiple pass oven comprising:
a frame, a plurality of superposed conveyors in said frame each having upper and lower reaches and the lower reach of each conveyor facing the upper reach of the conveyor next therebeneath, heating means beneath the upper reach of each conveyor for supplying heat thereto, means forming tunnels in said frame with each tunnel having a top wall extending over the top of the upper reach of a respective conveyor and side walls extending downwardly from the side edges of the top wall, said side walls having bottom edges upwardly from the top wall of the tunnel next therebeneath to provide a space for flow of air to said heating means, each conveyor comprising a series of plates extending transversely to the direction of travel of the conveyors, and hinges interconnecting the adjacent plates of each conveyor, said frame including rollers about which said conveyors pass at the reversing points thereof, the upper reach of each conveyor having a receiving end and a discharge end and adapted to receive articles to be baked at the receiving end and to discharge articles from the discharge end.

2. A multiple pass oven according to claim 1 in which means are provided to receive baked articles from the discharge end of the upper reach of the lowermost conveyor whereas each of the other of the conveyors has the said discharge end thereof positioned to deliver discharged articles to the receiving end of the upper reach of the conveyor next therebeneath.

3. A multiple pass oven according to claim 1 in which each tunnel has bottom walls extending inwardly and upwardly from the bottom edges of the side walls thereof, the inner edges of the bottom walls of each tunnel being in spaced relation and disposed on opposite sides of the said heating means for the respective conveyor.

4. A multiple pass oven according to claim 1 in which each tunnel below the uppermost one thereof has the said top wall disposed above the lower reach of the conveyor which pertains to the tunnel next thereabove.

5. A multiple pass oven according to claim 1 which includes a lower cover in said frame beneath the lower reach of the lowermost conveyor.

6. A multiple pass oven according to claim 1 in which said conveyors and tunnels are substantially horizontal.

7. A multiple pass oven according to claim 1 in which the lower reach of each conveyor is in opposed relation to the upper reach of the conveyor next therebeneath whereby the radiant heat from the lower reach is effective in respect of heating articles on the upper reach opposed thereto.

8. A multiple pass oven according to claim 1 in which each heating means is in the form of burner means distributed along the length of the respective upper reach, means for admitting combustion air to the burners between said tunnels, and means for withdrawing gases from at least one end of each tunnel.

9. A multiple pass oven according to claim 1 in which said heating means are in the form of burners and said frame comprises tubular structural elements via which fuel is conveyed to said burners.

10. A multiple pass oven according to claim 3 which includes a plate in said frame extending longitudinally therein beneath the lower reach of the lowermost conveyor.

11. A multiple pass oven according to claim 1 in which said side walls of each tunnel are spaced from the side edges of the respective conveyor, guide means in the frame for each conveyor extending along the side edges of the upper reach thereof, and support means in the frame supportingly engaging the underneath side of the upper reach of each conveyor near the side edges thereof.

12. A multiple pass oven according to claim 3 in which the said heating means for each conveyor includes a pipe extending longitudinally beneath the upper reach thereof between the inner edges of the bottom walls of the respective tunnel, and burners mounted on each pipe in longitudinally distributed relation and connected to receive fuel from the pipes.

13. A multiple pass oven according to claim 12 in which said frame includes laterally extending tubular members connected at the inner ends to said pipes and supporting said pipes, said frame comprising tubular elements forming at least part of the frame structure and connected to the outer ends of said tubular members, said tubular elements and said tubular members forming conduit means communicating with said pipes for the supply of fuel to said pipes.

* * * * *